UNITED STATES PATENT OFFICE 2,674,613

PREPARATION OF ORGANIC ACID COMPOSITIONS

John Walter Nelson, Hammond, Ind., assignor to Sinclair Refining Company, New York, N. Y., a corporation of Maine No Drawing. Application March 9, 1950, Serial No. 148,730

2 Claims. (Cl. 260—451)

In my copending application Serial No. 148,729, filed March 9, 1950, I have disclosed new, useful organic acid compositions and a general method for their preparation, by complete conversion of $C_{34}$–$C_{55}$ microcrystalline waxes under controlled oxidation conditions. The acid compositions are especially characterized by saponification numbers in the range of about 100 to 500, high content of fatty acid molecules having upwards of eighteen carbon atoms, and low solubility in water. Essentially, I have disclosed in my copending application that the acid compositions may be prepared by oxidizing microcrystalline waxes having 34 to 55 carbon atoms per molecule in the presence of a stoichiometric excess of oxygen and about 0.1 to 4.0% by weight of an oxidation catalyst at a temperature in excess of about 100° C. for a period of time sufficient to effect substantially complete conversion of the wax to acids.

But the period of reaction necessary to effect substantially complete conversion is lengthy and usually varies from at least 30 to 40 hours to as much as 200 to 300 hours or even more. Excessive reaction temperatures or the use of more oxygen do not greatly improve the reaction time and, in fact, tend to the formation of undesirable side products. On the other hand, the catalyst can only be used in regulated amounts as I have disclosed.

I have now found that by adding acid composition prepared in a prior run to the reaction mixture as a "seed," reaction time may be reduced as much as 50% and is usually at least 10 to 20% less, without any sacrifice in product quality or in reaction yield, in comparison with use of the catalyst alone under similar conditions of reaction. For example, a microcrystalline wax derived from a Texas crude and containing 34 to 55 carbon atoms per molecule is oxidized in the presence of potassium permanganate and 0.1 to 1.25% by weight of seed having a saponification number of 200–300. The reaction is carried out at about 110° C. with 150 to 225 liters of air per kilogram of wax per hour using 1.0 to 2.0% by weight of potassium permanganate. The reaction is continued until conversion is essentially complete, for instance, until the reaction mixture has a saponification number of at least 100, and usually, 200 to 500.

According to the present invention, I add about 0.1 to 4.0% by weight on the wax of the organic acid composition prepared in a prior run. Although the seed may be added before or after commencement of the oxidation reaction or before or after the addition of catalyst, I have found that a highly favorable reaction rate consistent with good product quality and yield is obtained by first adding the seed to the wax, then adding the catalyst in aqueous solution and commencing oxidation. After the catalyst is added the oxidizing gas may be added at reaction conditions. If the catalyst is added in aqueous solution, the solvent water may be removed by evaporation before reaction, as by heating to 145 to 150° C., if desired. Also, as is the case with the catalyst, additional seed may be added during the course of the reaction to step up the oxidation rate. In any event, particularly advantageous reaction rates are obtained when about 1.0 to 2.0% by weight of catalyst is employed and a similar amount of seed. I have found that the reaction will not go by adding the seed alone, that is, without employing at the same time the oxidation catalyst. Although the seed is generally used in the form resulting from the reaction I have described, it may be subjected to washing to remove excessive amounts of inorganic matter. For instance, the seed may be washed with water and hydrochloric acid to remove catalyst matter present.

I am well aware of the fact that certain waxes of petroleum origin have been, in the past, oxidized to products including organic acids. However, I believe that I am the first to find that valuable organic acids could be prepared in high yield from microcrystalline waxes having 34 to 55 carbon atoms per molecule, by complete conversion under conditions of controlled oxidation. Although I am not able to predicate my invention definitely on any particular theory, I think that the substantially complete degree of conversion in my process of preparing these acid compositions derives in large measure from the slight branching of the carbon chain making up the $C_{34}$ to $C_{55}$ microcrystalline wax molecules. This susceptibility to complete conversion appears to be unique with such waxes since other wax oxidation processes known to the art are generally restricted to only partial conversion. That is to say, investigators in the past appear to have carried out wax conversions to certain limited degrees. These investigators have found that reaction past an optimum point will break down the acids formed into lower molecular weight acids, while the partially reacted products tend to polymerize or resinify when reacted past a certain stage. As a result, these processes have been carefully restricted to limit undesirable side reactions such as those resulting in the formation of keto-acids, chain degradation and so forth, in order to obtain practical yields of useful products.

In the preparation of the organic acid compositions according to my invention, microcrystalline waxes containing about 34 to 55 carbon atoms per molecule are oxidized. The $C_{34}$–$C_{55}$ microcrystalline waxes are derived from higher boiling petroleum distillates and residues such as lubricating oil fractions. The waxes are largely composed of molecules especially characterized, according to my studies, by slight branchings in the carbon chain. This structure may be contrasted to crystalline wax molecules which are essentially straight chain. Generally, the branching in the microcrystalline wax molecule is at random along the chain, each branch appearing to contain an average of about three carbon atoms. The microcrystalline wax to be oxidized may be composed of molecules containing very similar or identical numbers of carbon atoms. Generally, however, the wax will be made up of mixtures of molecules over the range of 34 to 55 carbon atoms as well as having molecules of varying structure. The waxes may be oxidized in the pure or impure state, although elimination of contaminating substances prior to reaction tends toward better product quality. For instance, a $C_{34}$–$C_{55}$ microcrystalline wax obtained from a Texas crude may be purified for reaction by contact at elevated temperatures with aluminum chloride for a short period of time in the usual procedure well known in the art.

The reaction is also carried out in the presence of 0.1 to 4.0 per cent by weight on the wax of an oxidation catalyst. Satisfactory catalysts include those dispersible in the microcrystalline wax such as manganese salts, ammonium vanadate and potassium permanganate. I have found that potassium permanganate, present in amount of about 0.1 to 1.25 per cent by weight on the wax, is particularly advantageous as respects a shorter reaction period and improved product quality. In any event, less than about 0.1% of the catalyst results in inordinately prolonged oxidation periods while amounts greater than about 4% tend to oxidation products heterogeneous, inconsistent and stringy in appearance and poor in color. Oxidation catalyst promoters or sensitizers may be employed to accelerate the reaction rate even more. For example, sodium carbonate, manganese palmitate or other manganese salts, may be added in small amounts as accelerators, for instance, in amounts generally equal to or less than the quantity of the oxidation catalyst employed. The oxidation catalyst is advantageously added to the microcrystalline wax prior to commencement of the oxidation. In addition, I have found it advantageous to add the catalyst to the wax in aqueous solution and to remove the solvent water by evaporation. For instance, potassium permanganate may be added as a 15–20% by weight solution. The water is removed prior to reaction by applying heat, say by heating the mixture to 148–150° C., or air or oxygen may be added and the solvent water removed in the course of the reaction. Additional catalyst may be added later, that is, during the reaction, to step up the oxidation rate.

The acid compositions according to my invention are formed by oxidation of the reaction mixture in the presence of oxygen, either in pure form or in admixture with inert diluents, say as air. The oxygen is added in at least the stoichiometrical amount for a period of time sufficient to effect complete conversion. Advantageously, the oxygen is used in considerable excess of the stoichiometric quantity which reduces reaction time yet results in a very favorable product. I prefer to add oxygen, considered as substantially pure oxygen, in amounts in the range approximating 30 to 50 liters per kilogram of wax per hour. I have found that an amount of about 35 to 45 liters per hour of oxygen per kilogram of wax is particularly advantageous. In any event, amounts less than about 30 liters per hour of oxygen per kilogram of wax tends to unattractively long reaction periods while excessive quantities, i. e., over 50 liters per hour, is not necessary and is wasteful. The use of pure oxygen or diluted oxygen, such as air, does not noticeably affect product quality, although a higher oxygen concentration does improve reaction time. Good dispersion of the oxygen into the mixture undergoing reaction is necessary for minimum reaction periods. For instance, oxygen contact and dispersion may be improved by introducing the oxygen into the reaction mass and by constant agitation of the mass during the reaction.

Considerable latitude is afforded in oxidation temperature, although the thermal environment should be in excess of about 100° C. for the period of the reaction. Temperatures in the range of approximately 100 to 150° C. are preferred. I have found that oxidation temperatures between about 110 to 130° C. afford particularly favorable results, with a minimum of side product and carbon oxide formation and with maximum oxygen absorption. The reaction vessel may be cooled when necessary to maintain the desired temperature range since the reaction after commencement is exothermic in nature.

The reacted mixture is oxidized until the $C_{34}$–$C_{55}$ microcrystalline wax has been completely converted. During the course of the reaction, water, in vapor phase, and volatile acidic matter is given off in small quantities. Generally, the degree of conversion is determined by the saponification number and the length of time required for complete conversion depends in large measure upon the quantity of oxygen available to the wax undergoing reaction and the accompanying thermal environment. However, the catalyst employed, its properties and even the exact nature of the wax appear to figure in the reaction rate also. Usually, the microcrystalline wax is oxidized until the reaction mixture has a saponification number of at least 100 and advantageously to saponification numbers in the range of 200 to 400. However, saponification numbers in excess of about 500 indicate that cleavage is taking place and that complete conversion has been reached. In general, a prolonged period of oxidation is generally necessary, at least 30 to 40 hours, and reaction times as long as 300 to 400 hours are encountered.

The converted reaction mass is a solid product which is light brown in color and has low solubility in water. It has saponification numbers (determined in the usual manner) that lie in the range of about 100 to 500. The composition is principally made up of fatty acids of varying structure, in particular, containing substantial amounts of monobasic fatty acids of unusually high molecular weight, that is, over eighteen carbon atoms per molecule. However, small amounts of other materials of both an inorganic and organic nature are also present such as unreacted wax and catalyst material, which do not detract greatly from the utility of these compositions.

The following examples are intended to more clearly illustrate my invention.

Example I 2970 grams of a microcrystalline wax derived from a Sweet West Texas crude were charged into a reactor flask. 1.0% by weight of potassium permanganate dissolved in 150 ml. of water was added to the wax. The mixture was heated to 150° C. to remove the solvent water which took 3.0 hours. The mixture was then cooled to 110° C. and 1.0% by weight of a seed having a saponification number of 355 was added. The mixture was reacted at 110° C. in the presence of 37–44 liters per hour per kilogram of wax of pure oxygen. The reaction product had the following saponification numbers at the indicated stage of reaction:

| Reaction Time, Hours | Saponification Number |
| --- | --- |
| 20 | 152 |
| 40 | 260 |
| 60 | 320 |
| 100 | 390 |

The reaction was carried out for a total of 142.5 hours. A water layer and an acid layer were taken off overhead. The water layer weighed 1284 grams, had a saponification number of 755 (corr.), an iodine number of 0.8 and contained 55.2% by weight of water. The acid layer weighed 33 grams, had a saponification number of 390 (corr.), an iodine number of 7.6 and contained 6.3% by weight of water. The remaining solid reaction product had a saponification number of 430 and an iodine number of 1.3.

Example II 12,371 grams of a microcrystalline wax derived from a Sweet West Texas crude were charged into a rector flask. 1.1% by weight of potassium permanganate dissolved in 600 ml. of water was added to the wax. The mixture was heated to 150° C. to remove the solvent water which took 8.0 hours. The mixture was then cooled to 110° C. and 1.1% by weight of a seed having a saponification number of 338 was added. The mixture was reacted at 110° C. in the presence of 30 to 35 liters per hour per kilogram of wax of pure oxygen. The reaction product had the following saponification numbers at the indicated stage of reaction:

| Reaction Time, Hours | Saponification Number |
| --- | --- |
| 20 | 100 |
| 40 | 170 |
| 60 | 260 |

The reaction was carried out for a total of 95 hours. A water layer and an acid layer were taken off overhead. The water layer weighed 5443 grams, had a saponification number of 685 (corr.), an iodine number of 0.0 and contained 59.1% by weight of water. The acid layer weighed 151 grams, had a saponification number of 350 (corr.), an iodine number of 8.5 and contained 6.6% by weight of water. The remaining solid reaction product weighed 7106 grams, less analytical samples had a saponification number of 300, an acid number of 166 and an iodine number of 5.6.

Example III 3000 grams of a microcrystalline wax derived from a Sweet West Texas crude were charged into a reactor flask. 1.0% by weight of potassium permanganate dissolved in 300 ml. of water was added to the wax. The mixture was heated to 150° C. to remove the solvent water which took 2.75 hours. The mixture was then cooled to 110° C. and 1.1% by weight of a seed having a saponification number of 408 was added. The mixture was reacted at 110° C. in the presence of 37–44 liters per hour per kilogram of wax of pure oxygen. The reaction product had the following saponification numbers at the indicated stage of reaction:

| Reaction Time, Hours | Saponification Number |
| --- | --- |
| 20 | 150 |
| 40 | 246 |
| 60 | 296 |
| 100 | 354 |

The reaction was carried out for a total of 337 hours. A water layer and an acid layer were taken off overhead. The water layer weighed 1630 grams, had a saponification number of 713 (corr.), an iodine number of 0.4 and contained 53.1% by weight of water. The acid layer weighed 77 grams, had a saponification number of 422 (corr.) and contained 7.9% by weight of water. The remaining solid reaction product weighed 2328 grams, less analytical samples had a saponification number of 456, an acid number of 268 and an iodine number of 1.3.

Example IV 3000 grams of a microcrystalline wax derived from a Sweet West Texas crude were charged into a reactor flask. 0.5% by weight of potassium permanganate dissolved in 75 ml. of water was added to the wax. The mixture was heated to 150° C. to remove the solvent water which took 2.0 hours. The mixture was then cooled to 110° C. and 1.0% by weight of a seed having a saponification number of 430 was added (obtained from the reaction product of Example I). The mixture was reacted at 110° C. in the presence of 37–44 liters per hour per kilogram of wax of pure oxygen. The reaction product had the following saponification numbers at the indicated stage of reaction:

| Reaction Time, Hours | Saponification Number |
| --- | --- |
| 20 | 134 |
| 40 | 172 |
| 60 | 192 |
| 100 | 212 |
| 200 | 222 |

The reaction was carried out for a total of 212 hours. A water layer and an acid layer were taken off overhead. The water layer weighed 568 grams and the acid layer weighed 30 grams. The remaining solid reaction product weighed 2925 grams, less analytical samples had a saponification number of 219, an acid number of 115 and an iodine number of 5.5.

Example V 14,000 grams of a microcrystalline wax derived from a Sweet West Texas crude were charged into a reactor flask. 0.9% by weight of potassium permanganate dissolved in water was added to the wax. The mixture was heated to 150° C. to remove the solvent water. The mixture was then cooled to 110° C. and 4.0% by weight of a seed was added. The mixture was reacted at 110° C. in the presence of 37–44 liters per hour per kilogram of wax of pure oxygen. The reaction was carried out for a total of 394.5 hours. A water layer and an acid layer were taken off overhead. The water layer weighed 4450 grams, had a saponification number of 660 (corr.), an iodine number of 1.3 and contained 58.2% by weight of water. The acid layer weighed 392 grams, had a saponification number of 430 (corr.), an iodine number of 8.7 and contained 9.5% by weight of water. The remaining solid reaction product weighed 11,904 grams, less analytical samples had a saponification number of 292 and an acid number of 177.

Example VI 3390 grams of a microcrystalline wax derived from a Sweet West Texas crude were charged into a reactor flask. 0.9% by weight of potassium permanganate dissolved in water was added to the wax. The mixture was heated to 150° C. to remove the solvent water. The mixture was then cooled to 110° C. and 3.5% by weight of a seed was added. The mixture was reacted at 110° C. in the presence of 37–44 liters per hour per kilogram of wax of pure oxygen. The reaction was carried out for a total of 240 hours. A water layer and an acid layer were taken off overhead. The water layer weighed 1379 grams, had a saponification number of 654 (corr.), an iodine number of 0.8 and contained 56.8% by weight of water. The acid layer weighed 28 grams, had a saponification number of 350 (corr.), an iodine number of 9.4 and contained 8.3% by weight of water. The remaining solid reaction product had a saponification number of 265 and an acid number of 183.

Example VII 2168 grams of a microcrystalline wax derived from a Sweet West Texas crude were charged into a reactor flask. 1.0% by weight of potassium permanganate dissolved in water was added to the wax. The mixture was heated to 150° C. to remove the solvent water. The mixture was then cooled to 110° C. and 11.4% by weight of a seed was added. The mixture was reacted at 110° C. in the presence of 37–44 liters per hour per kilogram of wax of pure oxygen. Since no reaction took place after 24 hours the temperature was elevated to 143° C. in an attempt to start the reaction. There was still no reaction at the end of 74 hours when this run was terminated. Thus the use of an excessive amount of the seed prevents the reaction from taking place.

Example VIII 3000 grams of a microcrystalline wax derived from a Sweet West Texas crude were charged into a reactor flask. 1.0% by weight of potassium permanganate dissolved in water was added to the wax. The mixture was heated to 150° C. to remove the solvent water. The mixture was then cooled to 110° C. and 5.0% by weight of a seed having a saponification number of 456 was added (from reaction product of Example III). The mixture was reacted at 110° C. in the presence of 37–44 liters per hour per kilogram of wax of pure oxygen. No reaction took place. Thus the use of an excessive amount of the seed prevents reaction from taking place.

I claim:

1. The method of preparing organic acid compositions which comprises the step of oxidizing microcrystalline wax containing 34 to 55 carbon atoms per molecule in the presence of a stoichiometric excess of oxygen, about 0.1 to 4.0% by weight of potassium permanganate as an oxidation catalyst and 0.1 to 4.0% by weight on the wax of seed material derived from a prior reaction, at a temperature in excess of 100° C. but not in excess of about 150° C. for a period of time sufficient to effect substantially complete conversion of the wax, the said seed material being oxidized microcrystalline wax prepared by oxidizing microcrystalline wax containing 34 to 55 carbon atoms per molecule in the presence of a stoichiometric excess of oxygen and 0.1 to 4.0% by weight on the wax of potassium permanganate as an oxidation catalyst at a temperature in excess of 100° C. but not in excess of about 150° C. for a period of time sufficient to effect substantially complete conversion of the wax and to produce a product having a saponification number of within the range from about 100 to about 500.

2. The method according to claim 1 wherein the seed is added first to the microcrystalline wax, followed by the addition of the oxidation catalyst in aqueous solution, and the addition of the oxidizing gas.

References Cited in the file of this patent

UNITED STATES PATENTS

| Number | Name | Date |
|---|---|---|
| 2,156,266 | Murphree et al. | May 2, 1939 |
| 2,216,222 | Beller et al. | Oct. 1, 1940 |
| 2,274,057 | Gerlicher | Feb. 24, 1942 |
| 2,318,669 | Carr | May 11, 1943 |
| 2,337,336 | McCluer et al. | Dec. 21, 1943 |
| 2,391,236 | Hirsch | Dec. 18, 1945 |
| 2,486,454 | Zellner | Nov. 1, 1949 |

OTHER REFERENCES

Nelson: Petroleum Refinery Engineering, 3rd edition, pages 63–64 (1949).